Patented July 18, 1933

1,918,383

UNITED STATES PATENT OFFICE

EMIL CZAPEK AND ERWIN BAUER, OF BOMLITZ NEAR WALSRODE, GERMANY

MAKING HOLLOW BODIES FROM CELLULOSE COMPOUNDS AND THE LIKE

No Drawing. Application filed April 5, 1927, Serial No. 181,258, and in Germany May 30, 1925.

This invention which has already been made object of a German application filed May 30, 1925, has reference to improvements in the manufacture of hollow bodies from cellulose or from cellulose derivatives, and it is intended to facilitate the manufacture and to improve the quality and the appearance of such products. Coatings or hollow bodies from cellulose or cellulose-derivatives, such as are as an instance employed in the form of closing caps for bottle necks and for similar purposes have been generally obtained heretofore by the well known method of dipping the moulds, mandrels or equivalent means into a viscose solution with the subsequent coagulation and regeneration of the viscose in suitable baths. In order to prevent the coated carrier, such as for instance the bottle neck, from showing through the transparent coatings, the viscose has been mixed with finely ground pigments or colors, so as to render the coats opaque. In order to produce the desired degree of body and covering qualities a relatively large addition of earth-pigments is necessary. A well covering bottle-neck closing cap contains from 30 to 50% coloring or filling matter. This very considerable percentage of added pigments results in a dull appearance of the coatings, and in the case of the pigments not having been ground finely enough the coatings even acquire a rough, chalk-like outer appearance.

Now this invention among other important objects and advantages realized thereby, is intended to overcome this difficulty, and to improve the appearance of such coatings or caps of cellulose and cellulose-derivatives. With this end in view the step of dipping the mould or the like in viscose but once, as heretofore practised is modified according to this invention by employing two or more dipping operations previous to the treatment in the coagulation liquid, by which means a corresponding number of superimposed layers of viscose are produced which, by being mutually adjusted in shade and by their cooperation produce the desired improved optical impression of the coating or enveloping cap or the like. It has been ascertained that these superimposed layers of viscose during their coagulation become combined to each other most intimately, and without interfering with each other's properties, so that irrespective of this intimate union of the layers the heterogeneous condition of the entire coating from the optical point of view is maintained.

The principle of the invention may be realized and carried out in different ways. In accordance with this invention coatings of cellulose, such as, for instance, bottle-neck closing caps may be provided with a high-gloss finish by first dipping the mould or the like in the ordinary manner in the viscose containing the desired pigment, whereupon they are submitted to a short second dipping operation in thin colorless viscose, and then only the usual coagulation and further treatment by precipitating baths is resorted to. The lower thick layer that has been rendered opaque operates as a reflecting base, while the upper thin and transparent layer produces the same action as a varnish coating or as a ceramic glaze. The white or colored opaque caps or other hollow bodies which otherwise, in view of their high contents of fillers, would possess a dull surface, will thereby assume a beautiful and durable gloss, as has been shown in actual practice.

It is possible, moreover, to produce glossy hollow bodies with bronze colors or with other metallic pigments by the the method according to this invention from viscose. Heretofore it has not been possible to produce directly colored viscose-hollow bodies with metallic gloss, such as for instance bottle caps, because the addition of metal powders, such as bronze powders for instance, to the solution of viscose is not admissible on account of the chemical reaction occurring during the coagulation. This difficulty is obviated in accordance with this invention by the fact that the viscose is mixed for the first dipping stage with a filler producing a glossy surface, such as for instance, graphite, mica, powdered glass or with similar kinds of material, while the subsequent second dipping operation is carried out with a colored and correspondingly shaded and adjusted viscose. The glossy reflecting surface of the base produced by the first dipping stage causes the metallic gloss, while the colored, transparent or translucent coat obtained by the second dipping produces the particular metallic impression, such as for instance of gold or copper or the like. By a corresponding selection of the particular fillers, thickness of layers, solutions of viscose and by correspondingly varying other important conditions, it becomes possible to also produce other optical effects, such as for instance irridescence. With the view of increasing the optical impression the finished hollow body may also be submitted to a subsequent treatment with colors or dyes in the usual manner.

The invention also admits of the manufacture of two-colored or multicolored hollow bodies from cellulose or from cellulose derivatives in a simple manner, it being only necessary to employ differently colored solutions of viscose for the several dipping operations and to carry them out in such a manner that they will produce overlapping layers. This result may be obtained by immersing the mould or the like to a smaller depth into the viscose at each subsequent dipping operation than in the particular preceding dipping stage. By a corresponding adjustment of the depth of immersion the several colored rings of the hollow bodies will have a smaller or greater width imparted to them. By a suitable selection of the colors or pigments and of the thickness of the superimposed layers the most variegated and multicolored effects may be obtained. Whenever required, a final finishing particularly highly lustrous glazed or gloss may be applied to the coating by the immersion of the entire hollow body into a thin colorless viscose liquor.

The process according to this invention is not restricted to the employment of cellulose-xanthogenate solutions, but it may also be employed for the manufacture of moulded hollow bodies from other cellulose-derivatives, such as acetyl-cellulose and from nitrocellulose and the like, and other modifications and alterations are possible within the scope and spirit of the invention, without deviating from the essential features of the appended claims.

We claim:

1. The method of manufacturing hollow bodies from liquid cellulose compounds by dipping a moulding body into such a cellulose solution and coagulating the layer of cellulose solution upon this body in a precipitating bath, which method consists in providing several baths of cellulose solutions determined for the dipping of the moulding body, incorporating fillers with certain of said baths of cellulose solutions, dipping the moulding body into each of these cellulose solutions in subsequent operations so as to produce superimposed differently shaded layers upon the moulding body, dipping this moulding body together with the applied, superimposed layers of cellulose solutions into a precipitating bath and coagulating all these layers simultaneously in this precipitating bath.

2. The method of manufacturing hollow bodies from liquid cellulose compounds by precipitation, which consists in preparing a mixture of such a cellulose solution with a highly lustrous finely disintegrated filler, dipping a moulding body into said mixture so as to produce a layer of this mixture upon it, covering this layer with a second layer of a substantially transparent colored cellulose solution coagulating the cellulose simultaneously in both these layers upon said moulding body by means of a precipitating bath and finally applying a highly lustrous finish onto the resulting hollow body.

3. In the method of manufacturing hollow bodies from liquid cellulose compounds by applying a layer of cellulose solution onto a moulding body and coagulating this layer upon said body in a precipitating bath the immersion of the moulding body into several differently colored cellulose solutions in subsequent stages and to a smaller depth at each subsequent dipping operation than in the preceding dipping stage and the simultaneous precipitation and coagulation of all the layers produced upon said body in a common precipitating bath.

4. The method of manufacturing hollow bodies from viscose and other aqueous cellulose solutions capable of coagulation by precipitating liquids, which consists in applying a mixture of such an aqueous cellulose solution with a filler to a moulding body and then superimposing differently shaded layers of other aqueous cellulose solutions upon said underlying layer and finally precipitating all these layers upon said body simultaneously in a coagulating bath.

5. The method of manufacturing hollow bodies from viscose and other aqueous cellulose solutions capable of coagulation by precipitating liquids which consists in applying a mixture of such an aqueous cellulose solution with finely distributed lustrous bodies onto a moulding body, covering the layer thus produced with a thin substantially transparent layer of another aqueous cellulose solution and finally precipitating these two layers simultaneously upon the moulding body by means of a precipitating bath.

EMIL CZAPEK.
ERWIN BAUER.